(12) United States Patent
Bowman

(10) Patent No.: US 9,777,656 B1
(45) Date of Patent: Oct. 3, 2017

(54) METHOD OF VARYING VEHICLE ENGINE BRAKING TORQUE USING FULL AUTHORITY ACTIVE FUEL MANAGEMENT

(71) Applicant: GM GLOBAL TECHNOLOGY OPERATIONS LLC, Detroit, MI (US)

(72) Inventor: Carl B Bowman, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/292,672

(22) Filed: Oct. 13, 2016

(51) Int. Cl.
*F02D 41/12* (2006.01)
*F02D 41/02* (2006.01)
*F16H 63/50* (2006.01)
*F02D 41/00* (2006.01)
*F02D 41/30* (2006.01)

(52) U.S. Cl.
CPC ....... *F02D 41/123* (2013.01); *F02D 41/0087* (2013.01); *F02D 41/0225* (2013.01); *F02D 41/3005* (2013.01); *F16H 63/50* (2013.01); *F02D 2200/602* (2013.01)

(58) Field of Classification Search
None
See application file for complete search history.

(56) References Cited

U.S. PATENT DOCUMENTS

| | | | |
|---|---|---|---|
| 2003/0216847 A1* | 11/2003 | Bellinger | B60W 30/1819 701/51 |
| 2006/0017552 A1* | 1/2006 | Andreasen | B60K 35/00 340/438 |
| 2008/0081735 A1* | 4/2008 | Runde | B60W 10/06 477/107 |
| 2013/0035839 A1* | 2/2013 | Otanez | F02N 11/0837 701/102 |
| 2014/0324248 A1* | 10/2014 | Huntzicker | B60D 1/62 701/2 |

* cited by examiner

*Primary Examiner* — Colby M Hansen

(57) ABSTRACT

A method for intelligent active engine braking using full authority active fuel management based on vehicle speed and brake pedal position. The method includes determining if the tow mode of the vehicle has been selected and enables all engine cylinders to ensure maximum engine braking capacity is available. When vehicle tow mode is not selected then the method varies engine braking capacity by disabling one or more cylinders based on the vehicle speed and brake pedal position.

13 Claims, 4 Drawing Sheets

METHOD OF VARYING VEHICLE ENGINE BRAKING TORQUE USING FULL AUTHORITY ACTIVE FUEL MANAGEMENT

FIELD

The invention relates generally to automobile engine control and more particularly to a method of varying vehicle engine braking torque using full authority active fuel management control with deceleration fuel cutoff.

BACKGROUND

The statements in this section merely provide background information related to the present disclosure and may or may not constitute prior art.

A typical internal combustion engine is a combination of systems that individually serve a specific function. The air intake system provides throttled air to the engine. The fuels system stores, transports, and regulates fuel flow into the combustion chambers of the engine. The ignition system provides spark for igniting the air/fuel mixture. The power conversion system converts the chemical energy of combustion into work that is transferred to the tires of the vehicle. Other systems perform functions that improve fuel economy and emissions, cool the engine and provide heat to the vehicle cabin, or run other accessories such as power steering or air conditioning.

The size of the engine is typically tailored to the size and purpose of the vehicle. For example, a small light car built for fuel efficiency may include a small three cylinder or four cylinder engine with 1.5 to 2.0 Liters of displacement. Alternatively, a full-size pick-up truck or van that is purposely built for carrying tools and pulling machinery will require an engine having a larger displacement and more cylinders. A displacement of 4.5 L and above in a V8 or V10 configuration provides the torque and power required to carry and pull heavy loads, such as when the vehicle is operated in tow/haul mode. However, there are occasions of use when such a vehicle will not require all of the torque available in the V8 or V10 engine. It is during such occasions that it becomes desirable from a fuel efficiency standpoint to deactivate or simply not use all of the cylinders that are available. Thus, a method of operating the engine has been developed to improve fuel economy while maintaining the overall capacity of torque available to the vehicle operator.

Active fuel management methods have been developed which include shutting off fuel delivery to a cylinder when the torque demand on the engine is low. However, there are many issues with controlling an engine and powertrain when using active fuel management. Drivability, torque demand, Noise and Vibration must all be maintained or improved while at the same time improving fuel economy.

It is appreciated that when engine cylinders are deactivated with active fuel management methods that pumping losses associated with those cylinders are eliminated. These pumping losses directly affect the braking (negative) torque capacity of the engine, i.e., reducing the number of active cylinders directly reduces engine braking capacity which can allow the vehicle to coast longer distances. In some instances during active fuel management operation, it may be desirable to vary the level of engine braking capacity which could be beneficial under certain driving conditions.

Thus, while current active fuel management controls achieve their intended purpose, the need for new and improved active fuel management controls which ensure the vehicle operators expectations and desires are achieved is essentially constant.

SUMMARY

One or more exemplary embodiments address the above issue by providing an automobile engine control system, and more particularly to a method of varying vehicle engine braking torque using full authority active fuel management control with deceleration fuel cutoff.

According to an aspect of an exemplary embodiment, a method of varying vehicle engine braking torque using full authority active fuel management control with deceleration fuel cutoff includes determining if a vehicle's accelerator pedal position is decreasing. Another aspect of the exemplary embodiment includes determining if a transmission is in a highest gear when the accelerator pedal position is decreasing. Still another aspect of the exemplary embodiment includes controlling the vehicle to enter active fuel management and deceleration fuel cutoff when the transmission is in the highest gear. And another aspect of the exemplary embodiment includes detecting if vehicle tow mode has been requested.

Yet another aspect of the exemplary embodiment includes disabling active fuel management and deceleration fuel cutoff on all engine cylinders if vehicle tow mode has been requested. And yet another aspect includes disabling active fuel management and deceleration fuel cutoff on at least one engine cylinder based on vehicle speed and brake pedal position when vehicle tow mode has not been requested.

A further aspect of the exemplary embodiment includes determining if the vehicle is under low load. Yet a further aspect of the exemplary embodiment wherein determining if the accelerator pedal position is decreasing includes using a throttle position sensor. And still a further aspect of the exemplary embodiment includes determining if the accelerator pedal position is decreasing includes using an accelerator pedal position sensor.

And another aspect in accordance with the exemplary embodiment wherein determining if the transmission is in a highest gear includes using a gear position sensor or a message from the transmission control software to detect gear position. Another aspect of the exemplary embodiment wherein disabling active fuel management and deceleration fuel cutoff includes determining engine speed using a crankshaft position sensor signal and the PCM 20 can determine the vehicle speed based on the engine speed. And still another aspect of the exemplary embodiment wherein disabling active fuel management and deceleration fuel cutoff further includes determining brake pedal position using a brake pedal position sensor.

In accordance with another aspect of the exemplary method, wherein controlling further includes cutting off fuel injectors on at least one engine cylinder. And another aspect of the exemplary embodiment wherein controlling further includes deactivating operation of intake and exhaust valves. And still another aspect of the exemplary embodiment wherein disabling active fuel management and deceleration fuel cutoff to at least one engine cylinder further includes independently controlling at least one active fuel management actuator and at least one fuel injector to reactivate the at least one cylinder deactivated based on vehicle speed and brake pedal position.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
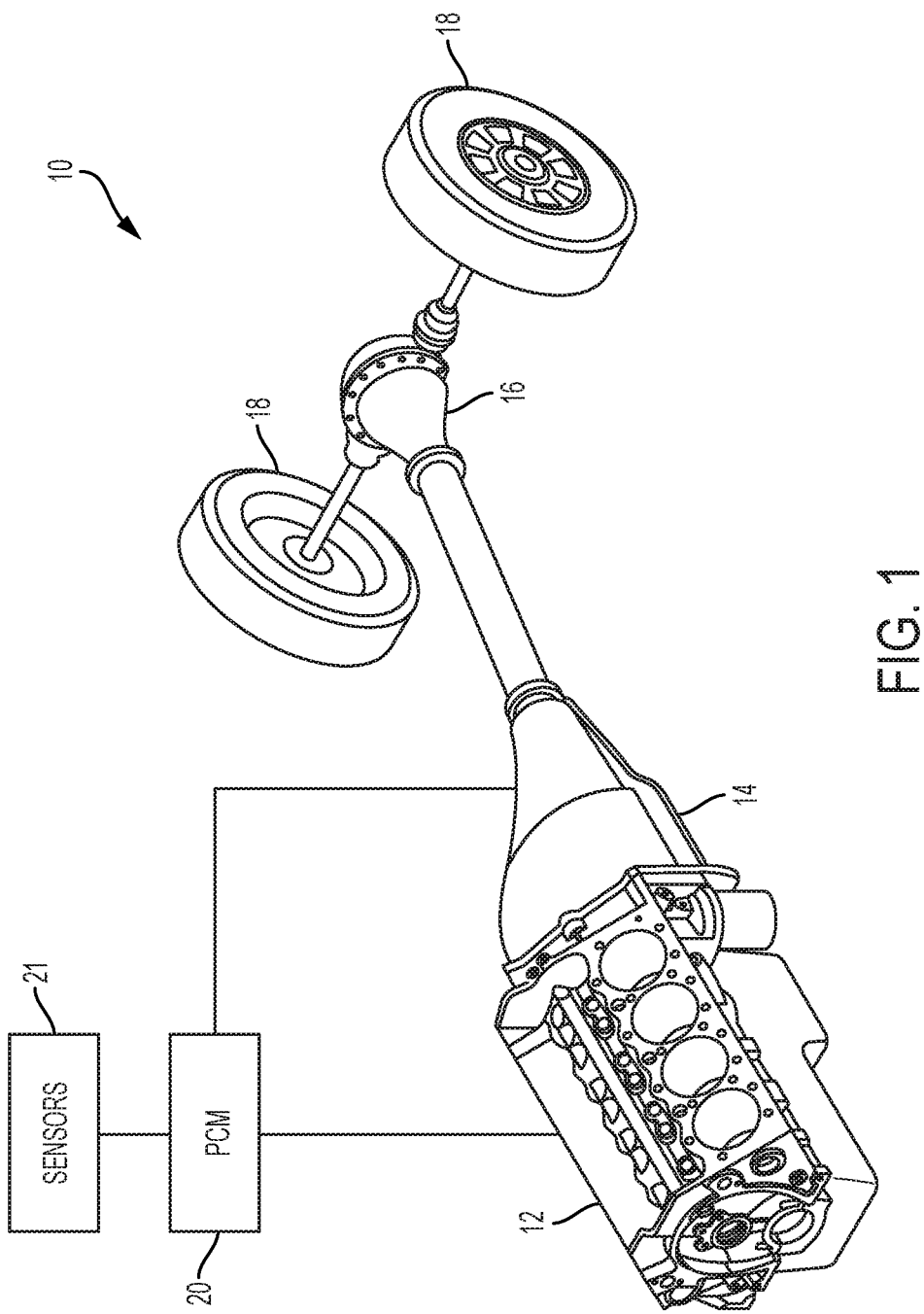
FIG. 1 is a depiction of a powertrain of a vehicle in accordance with an aspect of the exemplary embodiment.

With reference to FIG. 1, an exemplary powertrain is generally indicated by reference number 10. The powertrain 10 includes an engine 12, a transmission 14, a driveshaft and rear differential 16, drive wheels 18, and a powertrain control module 20 (PCM). Sensors 21 are in communication with the PCM 20 and can include, for example, an accelerator position sensor that senses the instantaneous position of an accelerator pedal (not shown), a brake pedal position sensor that senses the position of a brake pedal (also not shown), etc. The sensors 21 can then provide that information to the PCM 20.

The PCM 20 can compute the driver's commanded engine torque based on the vehicle speed and the position of accelerator pedal. The PCM 20 can also use the instantaneous position of the accelerator pedal (from an accelerator pedal position sensor) to compute a rate of the accelerator pedal position (or accelerator pedal position rate), and use the engine speed (from a crank sensor or cam sensor) to compute an engine acceleration and/or vehicle speed.

Sensors 21 can also include, for example, engine speed sensors such as a crank position sensor that can detect position and/or speed of a crankshaft and/or a cam position sensor that can detect position and/or speed of a camshaft (not shown), and provide that information to the PCM 20. For example, the crank position sensor can be used to detect position of crankshaft, and the cam position sensor can be used to detect position of camshaft (not shown).

In either case, the raw position signal (in terms of frequency (Hz)) can be sent to PCM 20 and conditioned/converted to speed (in terms of rpm). In this regard, the engine speed signals may be considered raw engine speed signals until signal conditioned by the PCM 20 or other signal conditioning circuitry. The sensors 21 can also include a wheel speed sensor (not shown) that can detect true vehicle speed and provide it to the PCM 20.

The engine 12 is an internal combustion engine that supplies a driving torque to the transmission 14. Traditionally, an internal combustion engine is identified by the number of cylinders it includes and in what configuration the cylinders are arranged. The engine 12 shown is a V8 configured engine 12 as the engine 12 includes eight cylinders arranged in a "V" configuration. The transmission 14, capable of several forward gear ratios, in turn delivers torque to the driveshaft and rear differential 16 and drive wheels 18.

Figure 2:
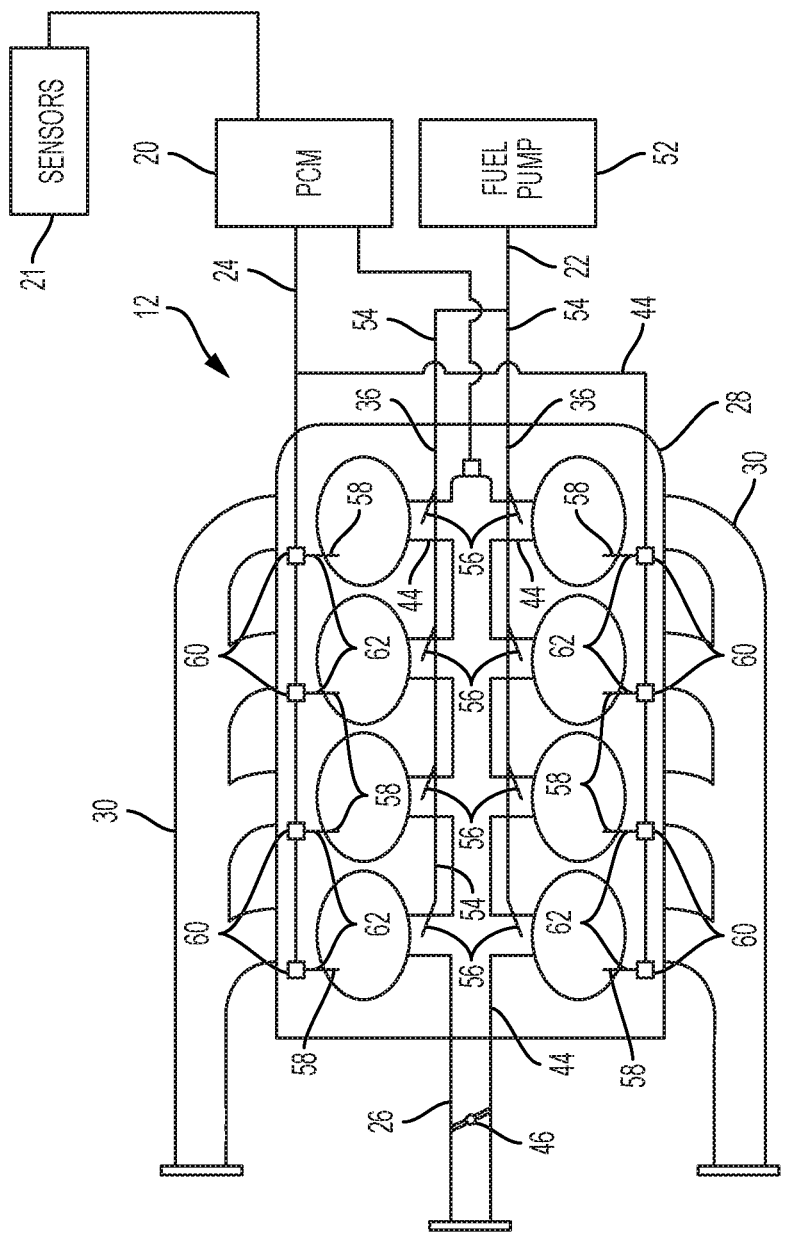
FIG. 2 is a top view schematic of an internal combustion engine, in accordance with an aspect of the exemplary embodiment.
Figure 3:
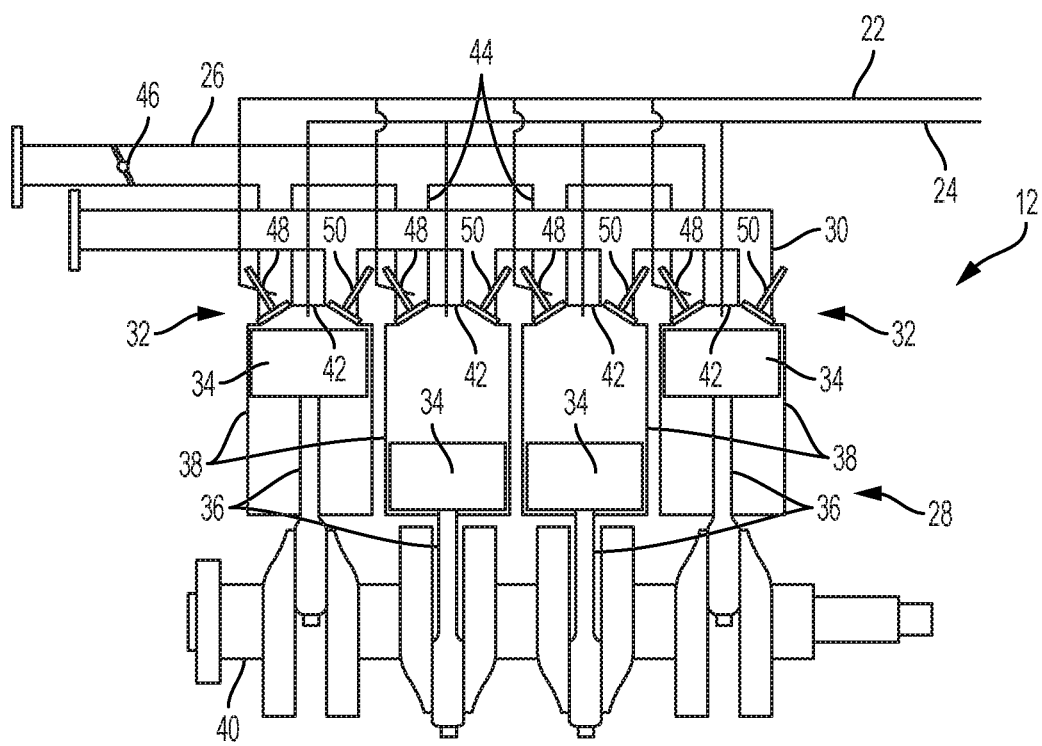
FIG. 3 is a side view schematic of an internal combustion engine, in accordance with an aspect of the exemplary embodiment.

Turning now to FIGS. 2 and 3, the engine 12 is illustrated and described in greater detail. The engine 12 as a system is a combination of multiple sub-systems operating in a coordinated manner managed by the powertrain control module 20 to convert combustion into mechanical work. For example, the engine 12 may include a fuel delivery system 22, an ignition system 24, an air intake system 26, a power conversion system 28, an exhaust system 30, and a valve train system 32, among other subsystems. More particularly, the power conversion system 28 includes a plurality of pistons 34, connecting rods 36, cylinders 38, and a crankshaft 40. Each piston 34 is disposed in one of the cylinders 38 with the piston 34 pinned to an end of a connecting rod 36 with the other end of the connecting rod 36 pinned to an offset journal of the crankshaft 40. The top side of the piston 34 and the cylinder 38 form a combustion chamber 42. The crankshaft 40 is connected on one end to an output member (not shown) for transferring torque to the transmission 14.

The air intake system 26 includes a plurality of air ducts 44 and a throttle valve 46. The throttle valve 46 controls the amount of airflow passing into the air intake system 26 while the air ducts 44 direct incoming air to be used in the combustion process into the combustion chamber 42.

The valve train system 32 includes an intake valve 48 and an exhaust valve 50 in each cylinder 38 and a mechanism (not shown) for actuating the intake valve 48 and exhaust valve 50. The intake valve 48 opens to allow communication between the air ducts 44 of the air intake system 26 and the combustion chamber 42. In the present example, there is only one intake valve 48 and one exhaust valve 50 in each combustion chamber 42. However, a valve train system 32 having more than one intake valve 48 or exhaust valve 50 in each cylinder 38 may be considered without departing from the scope of the present invention.

In accordance with aspects of the exemplary embodiment, a full authority active fuel management system (not shown) is operative to control the activation and deactivation of the intake and exhaust valves associated with each engine cylinder. In deactivation, the valves remain closed during engine cylinder intake and exhaust strokes which reduces pumping losses and the capacity for engine braking. For example, for a V8 engine, the full authority active fuel management system can selectively disable one, two, four or any number up to all eight of the engine cylinders 38 based on the vehicle speed and the brake pedal position to meet a desired level of vehicle deceleration during deceleration fuel cutoff mode (DFCO) as according to the exemplary embodiment.

The fuel delivery system 22 includes a pressurized fuel source or fuel pump 52, fuel lines 54, and fuel injectors 56. The fuel pump 52 is disposed in the fuel tank (not shown) located elsewhere in the vehicle. The fuel pump 52 pressurizes the fuel lines 54 which deliver pressurized fuel to the fuel injectors 56. The fuel injectors 56 are disposed in the air ducts 44 of the air intake system 26 proximate the intake valve 48. The fuel injectors 56 may also be located in the combustion chamber 42 wherein the fuel is injected directly into the combustion chamber 42.

The ignition system 24 includes spark plugs 58, ignition coils 60, and ignition wires 62. A single spark plug 58 is disposed in each of the combustion chambers 42. An ignition coil 60 is disposed electrically between the powertrain control module 20 and each of the spark plugs 58. The powertrain control module 20 sends a low voltage electric signal to the ignition coils 60 where the signal is stepped to a high-voltage signal required to create a spark and then sent to the spark plugs 58 through the ignition wires 62.

The exhaust system 30 collects exhaust gases from the combustion process in the combustion chamber 42 and directs the gases through a series of after treatment mechanisms such as catalytic converters and mufflers (not shown). Some of the exhaust gases can be diverted back to the intake system for improved combustion and fuel economy.

The powertrain control module 20 is electronically connected to at least the engine 12 and transmission 14 and is preferably an electronic control device having a preprogrammed digital computer or processor, control logic, memory used to store data, and at least one I/O peripheral. The control logic includes a plurality of logic routines or sequence for monitoring, manipulating, and generating data. The powertrain control module 20 controls the operation of each of the engine 12 and transmission 14. The control logic may be implemented in hardware, software, or a combination of hardware and software. For example, control logic may be in the form of program code that is stored on the electronic memory storage and executable by the processor. The powertrain control module 20 receives the output signals of several sensors throughout the transmission 14 and engine 12, performs the control logic and sends command signals to the engine 12 and transmission 14. The engine 12 and transmission 14 receive command signals from the powertrain control module 20 and converts the command signals to control actions operable in the engine 12 and transmission 14. Some of the control actions include but are not limited to increasing engine 12 speed, changing air/fuel ratio, changing transmission 14 gear ratios, etc., among many other control actions.

For example, a control logic implemented in software program code that is executable by the processor of the powertrain control module 20 includes control logic for implementing a method of operating the engine 12 in an active fuel management or cylinder deactivation mode or method. The cylinder deactivation mode is initiated to improve fuel consumption by cutting off fuel delivery to or deactivating selected cylinders while torque demand on the engine is less than the maximum torque available from the engine. A portion of the cylinder deactivation mode is controlling the operation of the engine as the engine is operating under cylinder deactivation mode and the vehicle operator is requesting additional torque. Such a portion of engine control is a cylinder reactivation torque smoothing control method 100. An important goal of the cylinder reactivation torque smoothing control method 100 is to provide a smooth, measured increase in torque from the engine 12 as the operator is requesting an increase in torque delivery to the wheels 18.

Figure 4:
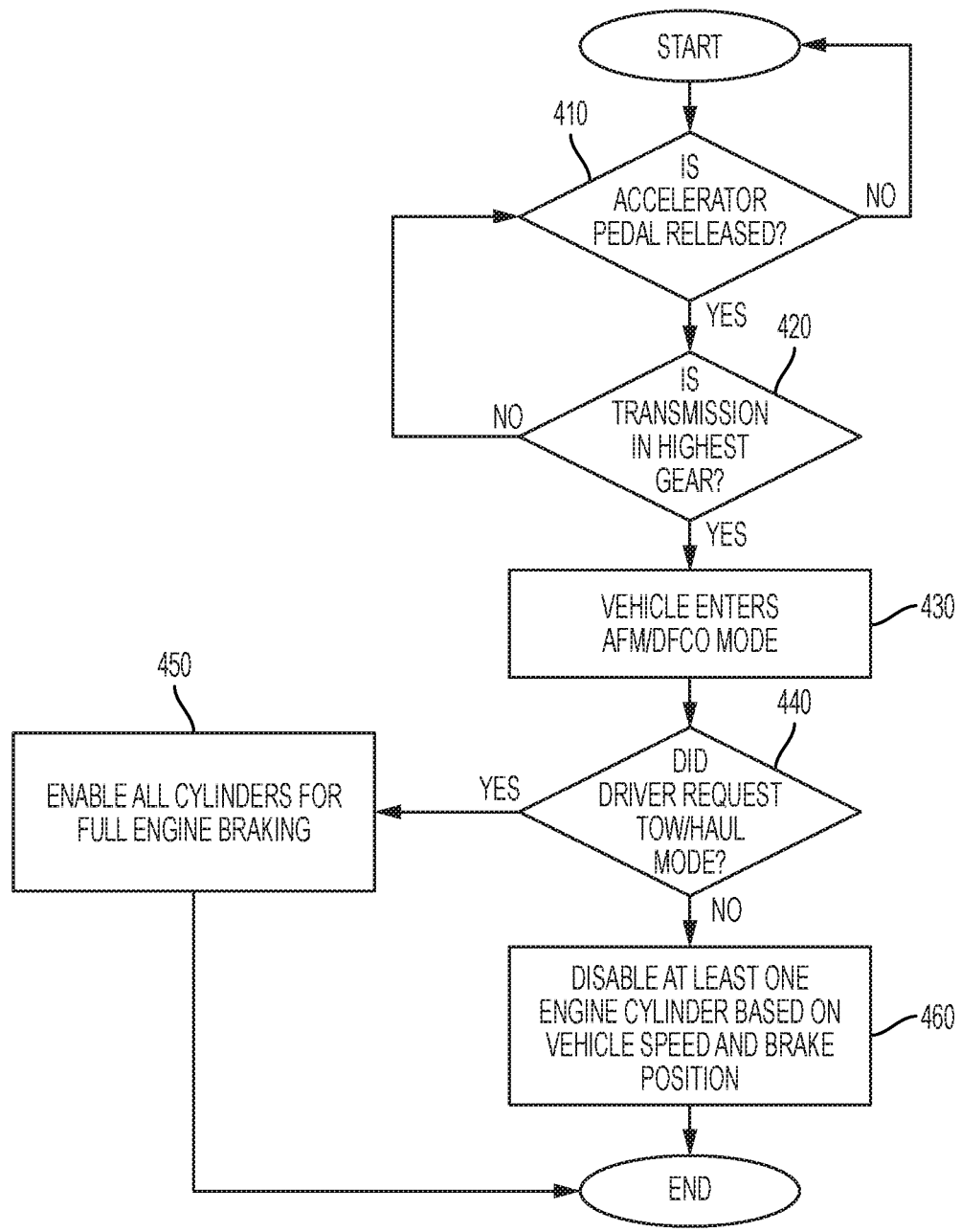
FIG. 4 is a schematic depicting a method of varying vehicle engine braking torque using full authority active fuel management control with deceleration fuel cutoff, in accordance with an aspects of the exemplary embodiment.

Referring now to FIG. 4, a schematic depicting a method of varying vehicle engine braking torque using full authority active fuel management control with deceleration fuel cutoff, in accordance with an aspects of the exemplary embodiment is provided. At block 410, the method begins with determining if the accelerator pedal is released. This may be accomplished using an accelerator pedal position sensor or a throttle position sensor for detecting a "tipping out" condition which is indicative the driver's foot being removed from the accelerator pedal. If the acceleration pedal is determined to be released then the method continues to block 420. If the accelerator pedal is determined not to be released then the method repeats at block 410.

At block 420, the method continues with determining if the transmission has upshifted to the highest gear according to shift pattern. Obtaining the highest gear before entering DFCO helps with transmission upshift control and reduces response delay by keeping the engine fueled in case the driver tips back in during upshifts. A gear position sensor or a message from the transmission control software may be used to determine if the transmission has been upshifted in accordance with the exemplary embodiment. If the transmission is determined to be upshifted to the highest gear then the moves to block 430. If the transmission is determined not to have upshifted to the highest gear then the method returns to block 410.

At block 430, the vehicle enters or maintains full authority active fuel management along with deceleration fuel cutoff mode. Full authority active fuel management entry occurs under steady state driving conditions with driver requesting torque and engine low load whereby the number of active cylinders can be reduced while still meeting torque demand and increasing fuel efficiency. When the accelerator pedal is released the requested torque from the driver is at the minimum which will enable the engine to enter DFCO mode along with full authority active fuel management in order to reduce the amount of fuel used and pumping losses of the engine.

At block 440, the method continues with determining if the vehicle tow/haul mode has been selected by the operator. If the vehicle's tow/haul mode has been selected then the method moves to block 450 where all engine cylinders are enabled to ensure that vehicle has maximum engine braking capacity to assist in slowing/stopping the vehicle as is needed due to the additional weight of tow load that the vehicle is hauling. If the vehicle's tow/haul mode is not selected then the method moves to block 460.

At block 460, the method disables at least one engine cylinder based on vehicle speed and brake pedal position. It is appreciated that the number of cylinders disabled can vary from one to the maximum amount of cylinders available based on the specific engine configuration in accordance with aspects of the exemplary embodiment. The vehicle speed can be determined by using a wheel speed sensor or a crank position sensor in accordance with aspects of the exemplary embodiment. In one embodiment, the number of cylinders disabled based on vehicle speed and brake pedal position are predetermined and stored in a PCM 20 or other control module as a look up table. Variable engine braking capacity could be beneficial and desirable under certain driving conditions and is made possible in accordance with aspects of the exemplary embodiments.

The description of the method is merely exemplary in nature and variations that do not depart from the gist of the embodiment are intended to be within the scope of the embodiment. Such variations are not to be regarded as a departure from the spirit and scope of the exemplary embodiment.

What is claimed is:

1. A method of varying vehicle engine braking torque using full authority active fuel management control with deceleration fuel cutoff comprising:
   determining if a vehicle's accelerator pedal position is decreasing;
   determining if the transmission has upshifted to the highest gear according to shift pattern when the accelerator pedal position is decreasing;
   controlling the vehicle to enter active fuel management and deceleration fuel cutoff when the transmission is in the highest gear;

detecting if vehicle tow mode has been requested;
disabling active fuel management and deceleration fuel cutoff on all engine cylinders if vehicle tow mode has been requested; and
disabling active fuel management and deceleration fuel cutoff on at least one engine cylinder based on vehicle speed and brake pedal position when vehicle tow mode has not been requested.

2. The method of claim 1 wherein determining if the vehicle is in a steady state condition further comprises determining if the vehicle is under low load.

3. The method of claim 1 wherein determining if the accelerator pedal is released further comprises using a throttle position sensor.

4. The method of claim 1 wherein determining if the accelerator pedal is released further comprises using an accelerator pedal position sensor.

5. The method of claim 1 wherein determining if the transmission is in a highest gear further comprises using a gear position sensor to detect gear position.

6. The method of claim 1 wherein determining if the transmission is in a highest gear further comprises using a message from the transmission control software.

7. The method of claim 1 wherein disabling active fuel management and deceleration fuel cutoff further comprises determining vehicle speed using a wheel speed sensor signal.

8. The method of claim 1 wherein disabling active fuel management and deceleration fuel cutoff further comprises determining vehicle speed using a crank position sensor signal.

9. The method of claim 1 wherein disabling active fuel management and deceleration fuel cutoff further comprises determining brake pedal position using a brake pedal position sensor.

10. The method of claim 1 wherein controlling further comprises cutting off fuel injectors on at least one engine cylinder.

11. The method of claim 10 wherein disabling active fuel management and deceleration fuel cutoff to at least one engine cylinder further comprises independently controlling at least one active fuel management actuator and at least one fuel injector to reactivate the at least one cylinder deactivated based on vehicle speed and brake pedal position.

12. The method of claim 1 wherein controlling further comprises deactivating operation of intake and exhaust valves.

13. The method of claim 1 wherein disabling active fuel management and deceleration fuel cutoff to at least one engine cylinder further comprises disabling a predetermined number of cylinders based on vehicle speed and brake pedal position in accordance with a look up table stored in a control module.

* * * * *